W. FIELDS.
CONDIMENT RECEPTACLE FOR KNIVES, FORKS, AND THE LIKE.
APPLICATION FILED AUG. 9, 1919.
1,317,691. Patented Oct. 7, 1919.
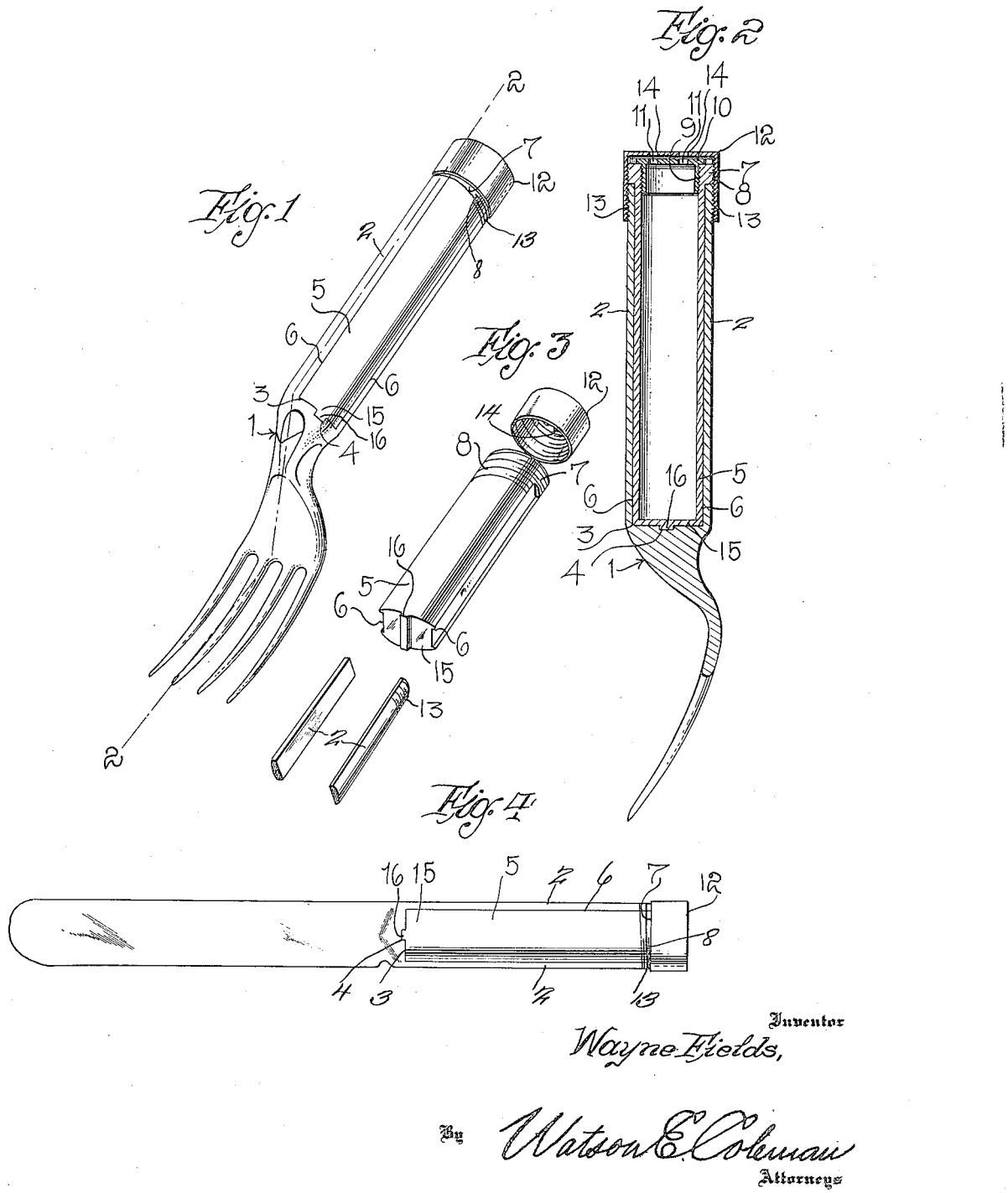
Inventor
Wayne Fields,
By Watson E. Coleman
Attorneys

UNITED STATES PATENT OFFICE.

WAYNE FIELDS, OF LONDON, KENTUCKY.

CONDIMENT-RECEPTACLE FOR KNIVES, FORKS, AND THE LIKE.

1,317,691.   Specification of Letters Patent.   Patented Oct. 7, 1919.

Application filed August 9, 1919. Serial No. 316,429.

*To all whom it may concern:*

Be it known that I, WAYNE FIELDS, a citizen of the United States, residing at London, in the county of Laurel and State of Kentucky, have invented certain new and useful Improvements in Condiment-Receptacles for Knives, Forks, and the like, of which the following is a specification, reference being had to the accompanying drawings.

This invention relates to an improved condiment receptacle for knives and forks and the like, particularly such condiments as salt and pepper, and one of the objects of the invention is to provide a device of this kind, which is simple, efficient and practical in construction, and may be manufactured for a relatively low cost and sold at a reasonable profit.

Another object of the invention is to provide means consisting of a perforated cap, which not only secures the receptacle to the implement, but also constitutes means to be adjusted, whereby its perforations may be registered with perforations of the closure proper of the receptacle, whereby the condiment, such as salt or pepper may be allowed to flow from the receptacle.

A further object of the invention is the provision of spaced arms carried by the table implement or fork, and between which the condiment receptacle is arranged. It is obvious that the receptacle also acts as a handle for the implement.

While the design and construction at present illustrated and set forth is deemed preferable, it is obvious that as a result of a reduction of the invention to a more practical form for commercial purposes, the invention may be susceptible to changes and the right to these changes is claimed, provided they are comprehended within the scope of what is claimed.

The invention comprises further features and combination of parts, as will be hereinafter set forth, shown in the drawings and claimed.

In the drawings:

Figure 1 is a view in perspective of a table implement such as a fork showing the improved condiment receptacle carried thereby.

Fig. 2 is a longitudinal sectional view through the same on line 2—2 of Fig. 1, through the spaced arms of the implement, illustrating how they are secured to the receptacle by the cap.

Fig. 3 is a detail perspective view of a portion of the implement showing the receptacle detached from between the spaced arms.

Fig. 4 is a detail perspective view of the receptacle, as applied to a knife.

Referring more especially to the drawings, 1 designates the table implement which, while it is illustrated as being a fork, it is clearly obvious that the receptacle may be attached to a knife or other article equally as well.

The implement is provided with a pair of elongated spaced arms 2, the crotch 3 between which is provided with a transverse groove 4. The condiment receptacle 5 for the reception of salt or pepper is provided upon diametrically opposite parts with elongated grooves 6, which receive the arms 2. The end 7 of the receptacle is exteriorly threaded as shown at 8, and the interior is likewise provided with threads 9. These threads 9 are engaged by a closure 10, which is provided with perforations 11. A cap 12 which is interiorly threaded, engages the threads 8 of the receptacle, and also the threads 13 of the outer faces of the end portions of the arms 2, thereby securing the receptacle between the arms. This cap 12 is provided with perforations 14, and by adjusting the cap in one direction, the perforations 14 may be made to register with the perforations in the closure, so that by shaking the implement in the usual manner, the condiments, such as salt or pepper may flow through the perforations, upon the food. Movement of the cap in a further direction or in the opposite direction may place the perforations of the cap out of registration with those of the closure, thereby preventing the flow of the condiment. It is obvious that the cap not only secures the receptacle in place, clamping the arms in position, but also acts as means for controlling the flow of the salt or pepper, it depending on which is used in the receptacle. The end 15 of the receptacle is provided with a rib 16, to engage the notch or groove 4, in order to reinforce the receptacle in place between the spaced arms of the implement.

The invention having been set forth, what is claimed as new and useful is:

1. The combination with an implement having a pair of spaced elongated members, of a condiment receptacle engaging between the members and a perforated cap detachably engaging said receptacle and the members, thereby performing the dual purpose of controlling the condiment and securing the receptacle between the members.

2. The combination with an implement having a pair of elongated parallel arms, of an elongated condiment receptacle engaging between the arms and having oppositely arranged elongated grooves receiving said arms, said receptacle having a perforated closure, and a perforated cap having threaded connections with the receptacle and the extremities of the arms, thereby performing the dual purpose of controlling the condiment through the perforations of the closure, and securing the receptacle between the arms.

3. The combination with an implement having a pair of elongated parallel arms, of an elongated condiment receptacle engaging between the arms and having oppositely arranged elongated grooves receiving said arms, said receptacle having a perforated closure, and a perforated cap having threaded connections with the receptacle and the extremities of the arms, thereby performing the dual purpose of controlling the condiment through the perforations of the closure, and securing the receptacle between the arms, the bottom of the space between the arms and one end of the receptacle having a notch and rib connection to reinforce the receptacle in position.

In testimony whereof I hereunto affix my signature in the presence of two witnesses.

WAYNE FIELDS.

Witnesses:
W. E. BEGLEY,
GEO. A. YOUNG.